US008675927B2

(12) United States Patent
Murakami

(10) Patent No.: US 8,675,927 B2
(45) Date of Patent: *Mar. 18, 2014

(54) METHOD AND APPARATUS FOR INFORMATION PROCESSING

(71) Applicant: Kabushiki Kaisha Toshiba, Tokyo (JP)

(72) Inventor: Masatoshi Murakami, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/771,502

(22) Filed: Feb. 20, 2013

(65) Prior Publication Data

US 2013/0163832 A1  Jun. 27, 2013

Related U.S. Application Data

(63) Continuation of application No. 12/730,156, filed on Mar. 23, 2010, now Pat. No. 8,401,249.

(30) Foreign Application Priority Data

Mar. 23, 2009  (JP) .................................. 2009-070975

(51) Int. Cl.
*G06K 9/00* (2006.01)
*H04N 5/228* (2006.01)

(52) U.S. Cl.
USPC ...................................... 382/118; 348/222.1

(58) Field of Classification Search
USPC ......... 382/103, 115, 116, 117, 118, 203, 190;
345/581; 348/169, 170, 171, 172, 239,
348/267, 222.1, 425.1, 571, 575, 608;
709/206
See application file for complete search history.

(56) References Cited

U.S. PATENT DOCUMENTS

| 5,933,527 A * | 8/1999 | Ishikawa ....................... 382/190 |
| 7,158,177 B2 * | 1/2007 | Kage et al. .................... 348/239 |
| 7,158,657 B2 * | 1/2007 | Okazaki et al. ............... 382/118 |
| 2008/0112621 A1 | 5/2008 | Gallagher et al. |

FOREIGN PATENT DOCUMENTS

| JP | 2000-244673 A | 9/2000 |
| JP | 2001-005967 A | 1/2001 |
| JP | 2001-160145 A | 6/2001 |

(Continued)

OTHER PUBLICATIONS

Notice of Reasons for Rejection for Japanese Patent Application 2009-070975, mailed Jun. 15, 2010.

(Continued)

*Primary Examiner* — Abolfazl Tabatabai
(74) *Attorney, Agent, or Firm* — Knobbe, Martens, Olson & Bear LLP

(57) ABSTRACT

According to one of embodiments, taking in facial image data for a user, extracting feature points of the face of the user from the facial image data and then coding the feature points, and registering the facial image data on a destination management table so that the facial image data is associated with a special identifier and/or the coded feature points. In particular, the face of the sender is incorporated into a video mail, so that the exchange of addresses (faces) is facilitated and the reliability of the e-mail itself can be enhanced. Further, a face can be automatically registered on an address book at a receiving end. In this case, a similar face can be updated by the latest face.

18 Claims, 10 Drawing Sheets

(56) References Cited

FOREIGN PATENT DOCUMENTS

| | | |
|---|---|---|
| JP | 2001-203819 A | 7/2001 |
| JP | 2002-92013 A | 3/2002 |
| JP | 2003-108935 A | 4/2003 |
| JP | 2005-267146 A | 9/2005 |
| JP | 2005-311883 A | 11/2005 |
| JP | 2007-028077 A | 2/2007 |
| JP | 2007-279776 A | 10/2007 |
| JP | 2008-136252 A | 6/2008 |
| JP | 2009-027221 A | 2/2009 |

OTHER PUBLICATIONS

First Office Action mailed by Japan Patent Office on Jun. 25, 2013 in the corresponding Japanese patent application No. 2010-282928.

* cited by examiner

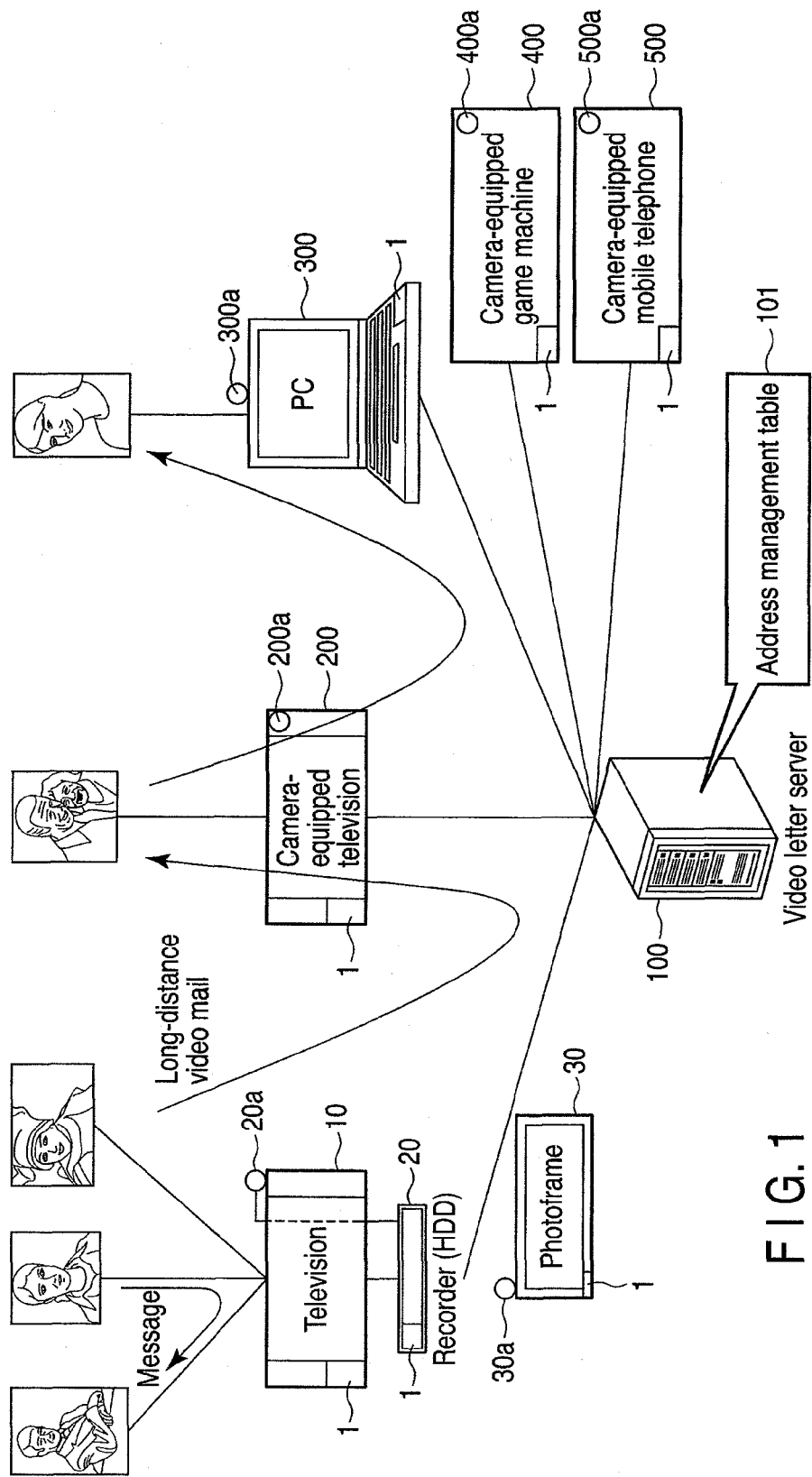
F I G. 1

| Face ID | Facial image | Facial feature point | Link to face ID of same individual | Mail address |
|---|---|---|---|---|
| 1 | | 5, 1082, B33, C, ... | 1 | DFCWE234A454@face.tosh iba.co.jp |
| 2 | | 4, 242, C25, D, ... | 2 | DFEW23GT4321@face.tosh iba.co.jp |
| 3 | | 8, 512, T23, E, ... | 3 | DFQ345KLUR21@face.tosh iba.co.jp |
| 4 | | - | 2, 3 | - (New mail address may be issued) |
| ... | | | | |
| 101a | 101b | 101c | 101d | 101e |

FIG. 2

| Face ID | Normal face image | Facial feature point | Link to face ID of same individual | E-mail address | Public face image |
|---|---|---|---|---|---|
| 11 | | 5, 1082, B33, C, ... | 1 | DFCWE234A454@face.tosh iba.co.jp | - |
| 12 | | 4, 242, C25, D, ... | 2 | DFEW23GT4321@face.tosh iba.co.jp | - |
| 13 | | 8, 512, T23, E, ... | 3 | DFQ345KLUR21@face.tosh iba.co.jp | - |
| 14 | | - | 2, 3 | (New mail address may be issued) | - |
| 15 | | 8, 345, X23, E, ... | 5 | DFCW345A454@face.tosh iba.co.jp | |
| ... | | | | | |

101α    101β    101γ    101δ    101ε    101ζ

F I G. 6

| Face ID | Facial image | User ID | Face information |
|---|---|---|---|
| 11 | | DFCWE234A454@face.toshiba.co.jp | Normal face image |
| 12 | | DFEW23GT4321@face.toshiba.co.jp | Normal face image |
| 13 | | DFQ345KLUR21@face.toshiba.co.jp | Normal face image |
| 14 | | DFCW345A454@face.toshiba.co.jp | Public face image |
| ... | | | |

101α, 101β, 101ε, 101ζ

F I G. 7

| | Information | Notes |
|---|---|---|
| 1 | Video object | Video data |
| 2 | Facial image of sender | Facial image of sender |
| 3 | User ID of sender | Not open to public. Automatically generated on registration of facial image |

F I G. 8

| | Information | Notes |
|---|---|---|
| 1 | Address to video object | Address where video data is located |
| 2 | Facial image of sender | Facial image of sender. User ID of sender also contained therein |

F I G. 9

| | Information | Notes |
|---|---|---|
| 1 | Video object ID | ID for obtaining video data from server |
| 2 | User ID of sender | Facial image of sender also acquired from server using this ID |

F I G. 10

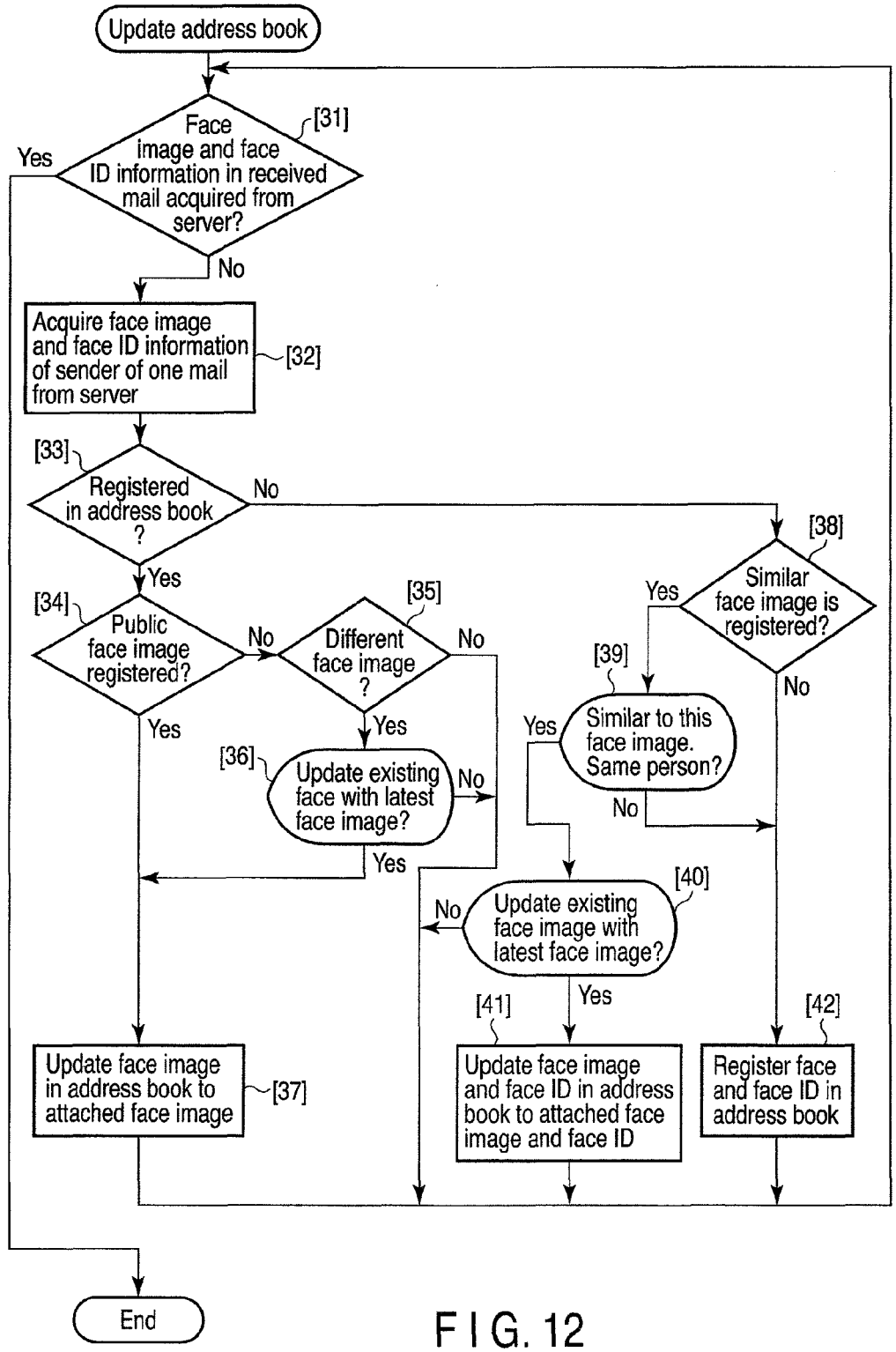
F I G. 12

METHOD AND APPARATUS FOR INFORMATION PROCESSING

CROSS-REFERENCE TO RELATED APPLICATIONS

This application is a continuation of U.S. patent application Ser. No. 12/730,156, filed Mar. 23, 2010, which is based upon and claims the benefit of priority from Japanese Patent Application No. 2009-070975, filed Mar. 23, 2009, the entire contents of each of which are incorporated herein by reference.

BACKGROUND

1. Field

One embodiment of the present invention relates to a method and an apparatus for information processing using face authentication.

2. Description of the Related Art

Electronic mail (e-mail) has been in wide use for a long time. In particular, e-mail provides a convenience that telephones do not (e.g., the receiving end can view contents no matter when or where, and tends not to be bound time-wise to the time of reception). On the other hand, e-mail has the following drawbacks as compared with the telephones:

1> A keyboard is generally used to input information, which is a major hurdle for older people, small children or disabled people who are not good at typing.

2> A predetermined environment is needed to send and receive e-mail, but there is limitation (e.g., a mobile telephone, personal computer [PC] or the like is needed, and an environment where a network is available is demanded).

3> The telephone achieves its function when a direct conversation (talk) with a partner is held. However, e-mail requires the creation (input) of a document and is therefore not equal to the telephone in immediacy.

4> E-mail is not suitable, for example, when a plurality of persons such as family members see a message and independently reply to the message.

In addition, video telephones or video chats have heretofore been present in dedicated video telephones or personal computers. However, these are extensions of the telephones and do not provide the above-mentioned convenience of e-mail (e.g., there is no need for the presence of a partner at the right time and at the right place).

Japanese Patent Application Publication (KOKAI) No. 2005-267146 (Document 1) discloses "a method and apparatus for creating electronic mail using an image recognition function" as a means of obtaining an e-mail environment where the above-mentioned drawbacks of e-mail are minimized.

According to this document, the face of a person in a picture taken by a camera of a mobile communication terminal is recognized, and a "table in which the faces of persons and their e-mail addresses are registered in advance" is searched for the recognized face. Thus, the e-mail address of the person in the picture is found so that the picture can be sent to this person. By this function, content to be sent by e-mail can be created without any keyboard as in the case of a picture. Consequently, even a user who is unaccustomed to the keyboard can send an e-mail.

Japanese Patent Application Publication (KOKAI) No. 2001-203819 (Document 2) discloses a data registration method, wherein the necessity of the operation of a terminal by a partner is eliminated so that given data such as image data can be registered on the terminal of the partner, or information on e-mail standards supported by the terminal of the partner can be acquired and then registered in, for example, a telephone directory of a terminal at a sending end.

According to this document, information (e.g., a face) which is not included in the protocol of, for example, an e-mail is automatically acquired by the terminal at the receiving end from the terminal at the sending end after the reception of the e-mail, and can be registered in an address book of the terminal at the receiving end.

However, the problem associated with the "use of the face authentication function" shown in Document 1 is that, for example, an e-mail may be sent to the wrong person. That is, face recognition with one-hundred-percent accuracy is technically difficult at present by mechanical processing alone.

On the other hand, the following problems are included in the method shown in Document 2: the partner can not see a face if the face is not registered on the terminal at the sending end; and even if the face changes with, for example, growth, the face registered on the terminal at the receiving end remains the same and is not updated.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary diagram showing an example of the whole e-mail system using face authentication according to an embodiment of the present invention;

FIG. 2 is an exemplary diagram showing an example of a destination management table (address book) used by the system shown in FIG. 1, according to an embodiment of the present invention;

FIG. 6 is an exemplary diagram showing a specific example of the destination management table (address book) for using the face (facial image) in the system shown in FIG. 1 as an e-mail address, according to an embodiment of the present invention;

FIG. 7 is an exemplary diagram showing an example of a method of creating the address book from the destination management table shown in FIG. 6, according to an embodiment of the present invention;

FIG. 8 is an exemplary diagram showing an example of additional information used to create the address book from the destination management table shown in FIG. 6, according to an embodiment of the present invention;

FIG. 9 is an exemplary diagram showing an example of additional information used to create the address book from the destination management table shown in FIG. 6, according to an embodiment of the present invention;

FIG. 10 is an exemplary diagram showing an example of additional information used to create the address book from the destination management table shown in FIG. 6, according to an embodiment of the present invention;

FIG. 12 is an exemplary diagram showing an example of the method of identifying and updating (registering) the face (facial image) attached to the received e-mail in the system shown in FIG. 1, according to an embodiment of the present invention.

DETAILED DESCRIPTION

Figure 3:
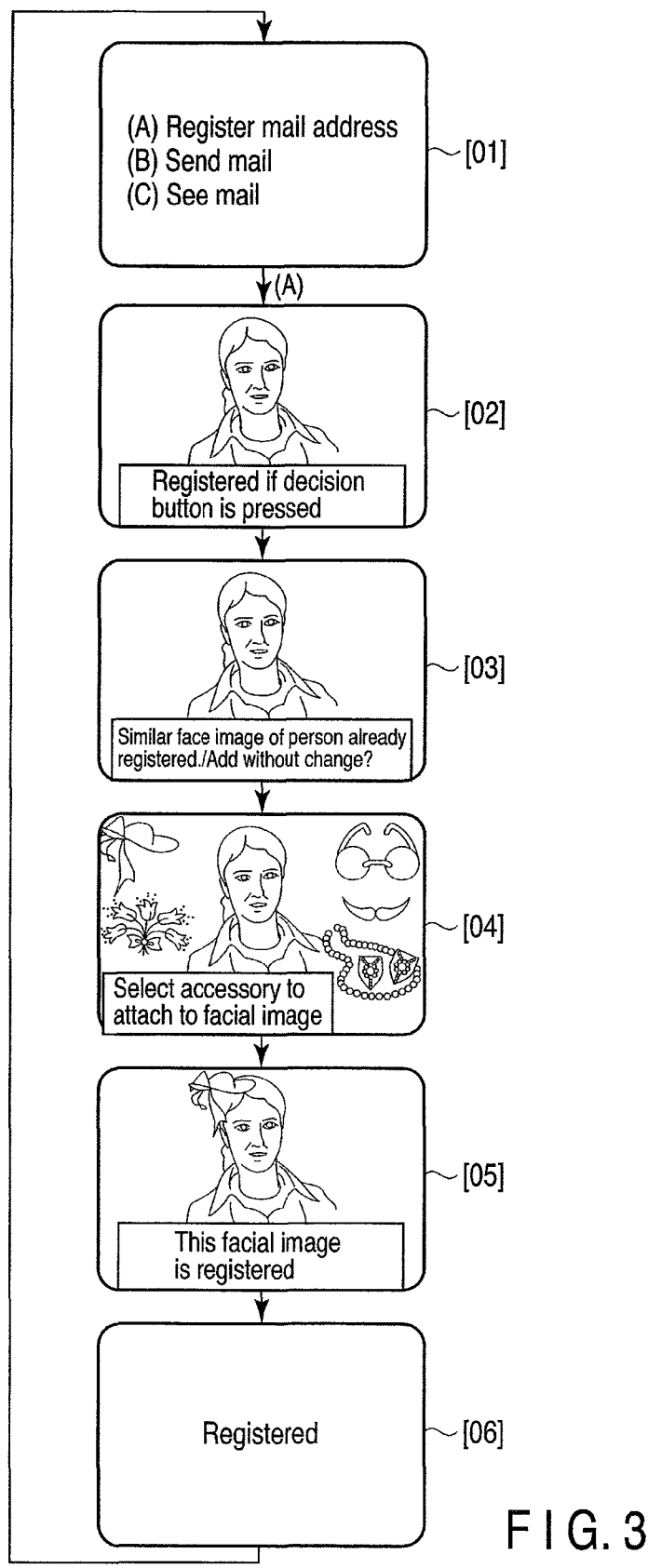
FIG. 3 is an exemplary diagram showing an example of a method of identifying and registering a face (facial image) attached to a received e-mail in the system shown in FIG. 1, according to an embodiment of the present invention.

Various embodiments according to the invention will be described hereinafter with reference to the accompanying drawings. In general, according to one embodiment of the invention, an information processing method comprising: taking in facial image data for a user; extracting feature points of the face of the user from the facial image data and then coding the feature points; and registering the facial image data on a destination management table so that the facial image data is associated with a special identifier and/or the coded feature points.

Embodiments of this invention will now be described hereinafter in detail with reference to the accompanying drawings.

FIG. 1 shows an outline of the whole e-mail system using face authentication. In addition, the systems described herein can be implemented as software applications, hardware and/or software modules, or components on one or more computers, such as servers. While the various modules are illustrated separately, they may share some or all of the same underlying logic or code.

The e-mail system shown in FIG. 1 is obtained by one of a television receiver (home user terminal) 10, a video recorder (home user terminal) 20 and an information reproducer (home user terminal) 30 and by a video letter server 100. The television receiver 10 receives television broadcast signals provided from a broadcaster or a relay broadcaster by radio using electromagnetic waves or by a wired transmission method using, for example, optical fibers, and then reproduces the television broadcast signals. The video recorder 20 retains a high-capacity storage typified by a hard disk drive (HDD). The information reproducer 30 is called, for example, a photoframe. The video letter server 100 is connected to the home user terminals via a network such as an optical fiber network or public communication network.

A camera-equipped television device 200, a personal computer (PC) 300, a camera-equipped game machine 400 and a camera-equipped mobile telephone 500 can freely access the video letter server 100. The camera-equipped television device 200 and the personal computer 300 are provided in a place different from the place where home user terminal (the television receiver 10 or the video recorder 20 or the photoframe 30) is installed. For example, the camera-equipped television device 200 and the personal computer 300 are provided at given positions in the house of a relative or an acquaintance. The camera-equipped game machine 400 and the camera-equipped mobile telephone 500 are, for example, portable terminals which can access an external network.

The video letter server 100 temporarily retains, for example, an e-mail (video mail), a picture or a moving image file sent from the home user terminal (the television receiver 10, the video recorder 20 or the photoframe 30, and a sender using the same), and reports to a partner (recipient) that the e-mail (video mail), picture or moving image file has been received. In addition, an existing content can be attached to the video mail, in addition to the image and voice of the user (i.e., the sender) who is in front of a camera 20a attached to the video recorder 20 connected to the television receiver 10 or in front of a camera 30a attached to the photoframe 30. The existing content (only to the extent that does not infringe on the rights of others, for example, a copyright) includes video pictures taken by the user, digital camera images taken by the user, audio or music recorded by the user, pictures and audio (music) of broadcast programs recorded on the video recorder, and pictures and audio (music) distributed on the Internet belonging to the public domain.

The partner (recipient) retaining the camera-equipped digital television device 200, the personal computer (PC) 300, the camera-equipped game machine 400 or the mobile telephone 500 that is connected to the video letter server 100 on the network (that can access the video letter server 100) can reproduce, by given timing, not only the pictures and audio sent by the user (i.e., the sender) in front of the camera (20a, 30a) attached to the video recorder 20 or the photoframe 30 connected to the television receiver 10 but also the content added thereto.

Figure 13:
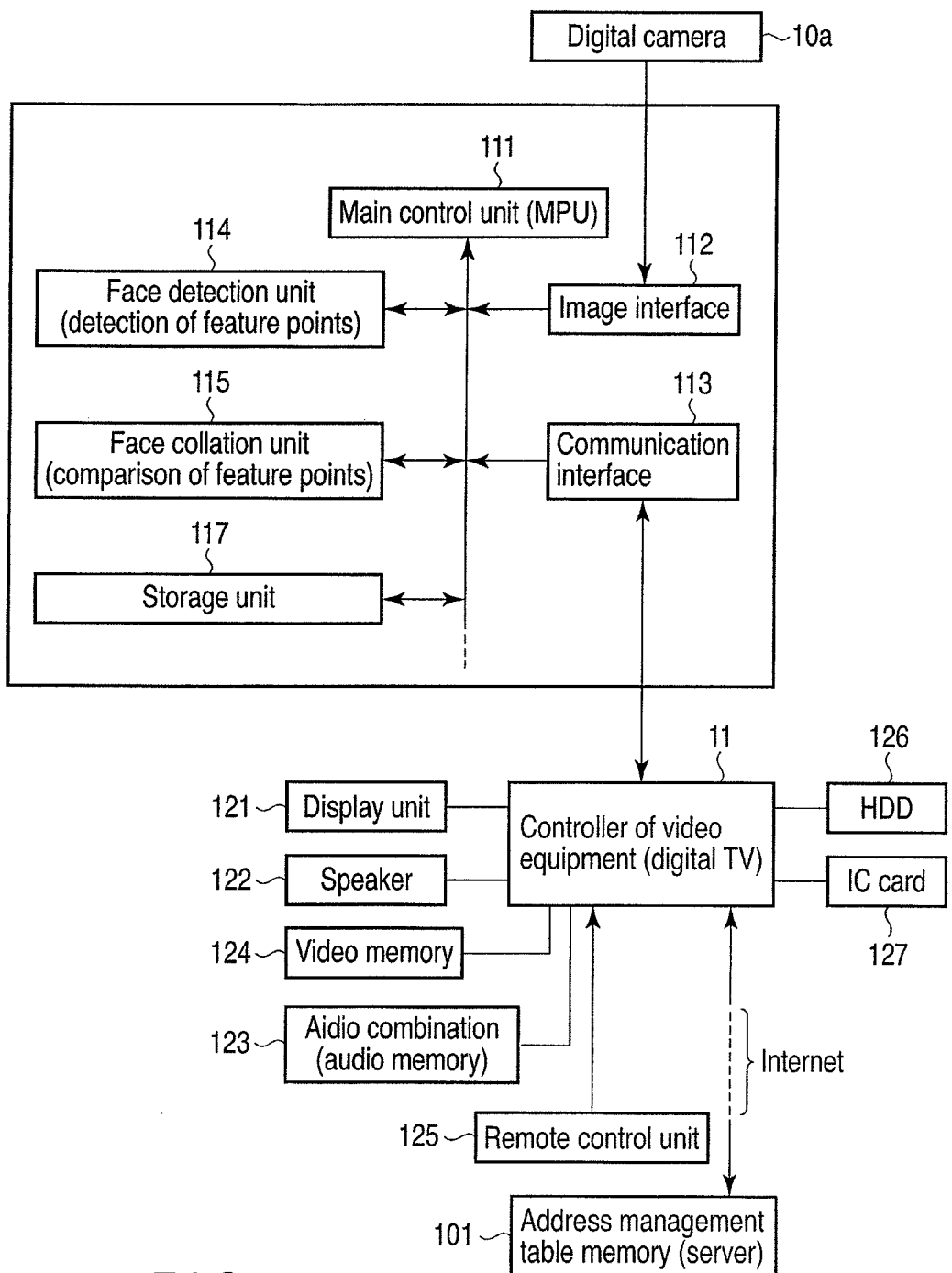
FIG. 13 is an exemplary diagram showing an example of the configuration of a face authentication/collation processing apparatus applicable to the system shown in FIG. 1, according to an embodiment of the present invention.

In addition, a face authentication/collation processing apparatus 1 described later with FIG. 13 is incorporated in each of the sending end user terminal (10, 20, 30) and the receiving end terminal (200, 300, 400, 500). The face authentication/collation processing apparatus 1 can code the features of the face of the user in front of the camera (20a, 30a, 200a, 300a, 400a, 500a) integrally provided in each user terminal, or collate the features of the face of the user in front of the camera with the features of a registered face. Moreover, data on the image of the face of the user taken in by the camera of each user terminal, feature point data in which the features of the face are coded by the face authentication/collation processing apparatus 1, etc., are registered on a destination management table 101 provided in the server 100.

The video mail (e-mail content) from each user itself is associated with the contents registered on the destination management table 101, and stored in an unshown data storage (high-capacity storage) in the server 100.

In the e-mail system shown in FIG. 1, the facial image which can be visually recognized by the user can be used as an address to send and receive home message e-mails via a home local area network of the user. It is also possible to, via the Internet, send a video mail to another (e.g., a relative or an acquaintance) situated in a remote and receive a video mail from each.

In addition, in the house of the sending end user or the house of the receiving end user, the contents in the destination management table 101 can be copied to, for example, an unshown HDD (high-capacity storage) of the television unit 10 or the recorder 20, or a semiconductor memory device (an HDD in some case) of the photoframe 30, or to a similar storage of the personal computer (PC) 300 or the camera-equipped television device 200. Thus, a device such the television unit 10 or the video recorder 20 can be independently used to exchange video mails (or messages) at home. Moreover, if a message is open to the public, the message can be communicated to any family member who has turned on the television unit 10 at home. The video mail or message can be easily opened to the public at home if the television unit 10 or the video recorder 20 (or the photoframe 30) functions as a home server.

FIG. 2 shows one example of the destination management table 101 retained by the video letter server 100.

The destination management table 101 contains, for example, five items of information. Identifiers 101a to 101e are allocated to the items to identify these items. The column of the identifier 101a indicates face IDs (numbers) used to identify the face of the sender or receiver. The column of the identifier 101b indicates facial image data corresponding to the face IDs. The column of the identifier 101c indicates the feature points of the face contained in the facial image data. The column of the identifier 101d indicates links to the face IDs. The column of the identifier 101e indicates the correspondence between e-mail address and the facial image data (face IDs).

The ID number incremented (sequentially added) in the order of registration is written in each row of the column of the identifier 101a. This ID number is allocated to the facial image in the same row (in FIG. 2, 1 is allocated to a boy, 2 is allocated to an elderly man "grandfather", 3 is allocated to an elderly woman "grandmother", and 4 is allocated to the elderly man and the elderly woman "grandfather of 2 and grandmother of 3").

Bitmap data for the facial image of the user taken in by the camera is registered in each row of the column of the facial image data 101b. The bitmap data for the facial image may be data obtained by deleting background data around the facial image of the user (it is also possible to change the background of the facial image into a plain form such as a blue-back form, replace the background image with a still image separately taken by a digital camera, or replace the background image with moving images separately taken by the digital camera).

A code to recognize the feature points of the face of one user or the faces of a plurality of users included in the registered facial image is written in each row of the column of the face feature point 101b.

One or more ID numbers allocated to the face of the same individual user are written in each row of the column of the identifier link 101d. Therefore, as apparent from the column of 101e, the e-mail address corresponding to ID4 is linked to the e-mail addresses of the elderly man "grandfather" of ID2 and the elderly woman "grandmother" of ID3 so that the e-mail addresses of these two persons may be available, for example, when an e-mail is sent to these persons at the same time. In addition, assuming that both the elderly man "grandfather" of ID2 and the elderly woman "grandmother" of ID3 see (receive) the e-mail at the same time via, for example, the photoframe 30, a new e-mail address targeted for these persons can be prepared (the row of the face ID 4).

FIG. 3 shows the outline of the flow of user operation in the e-mail system using the destination management table (see FIG. 2) formed in the video letter server shown in FIG. 1. In addition, processing shown in FIG. 3 corresponds to the "face authentication" processing/"collation" processing performed by the face authentication/collation processing apparatus 1 described later with FIG. 13, and processing performed by a given information processing apparatus also described later with FIG. 13 (in the example of FIG. 3, a controller 120 of the television receiver 10 in FIG. 1).

For example, the face of the sender of a received video mail is displayed in the method of acquiring and registering a sender e-mail address (face) (block [01]). More specifically, when a video mail is sent, a facial image (bitmap data) of the sender is attached to the e-mail. Alternatively, a face ID (this has only to enable the identification of the face and may be the e-mail address itself) or address information for access to the facial image is added.

At the receiving end of the video mail, the face of the sender is automatically displayed in the address book (of the person who has received the video mail, that is, of the person designated as a partner by the sending end) (block [02]). In addition, if [register] is selected via a graphical user interface (GUI) displayed in the screen of the television device 200 using, for example, an unshown remote controller (here, the user terminal at the sending end is described as the television receiver 10, and the receiving end (partner) is described as the camera-equipped television device 200 which can access the video letter server 100 via the network), the facial image of the sender is registered on the above-mentioned address book.

At this moment, when a similar face has been registered in the address book, whether to register (add) the facial image as it is checked (block [03]).

When it is not selected in the block [03] to register the received facial image as it is, whether to attach any accessory for differentiation is checked in order to differentiate from the facial image which has already been registered in the address book (block [04]).

When, for example, a "ribbon" is attached in block 04, whether to register the facial image (the facial image to which the ribbon is attached) in the address book is checked (block [05]).

Subsequently, when the registration of the facial image (the facial image to which the ribbon is attached) in the address book is selected via the GUI in block 05, the facial image of the sender is registered on the above-mentioned address book (block [06]).

In addition, the above-mentioned blocks [03] to [05] show the procedure wherein a facial image to which the accessory is attached is added (updated) in the address book in accordance with an adding (updating) request by the owner of the address book (receiving end [partner]) when a similar face has already been registered in the address book but is the face of a different person. When a facial image of a person which has already been registered in the address book has become different, the facial image registered in the address book can be updated by a similar procedure.

Figure 4:
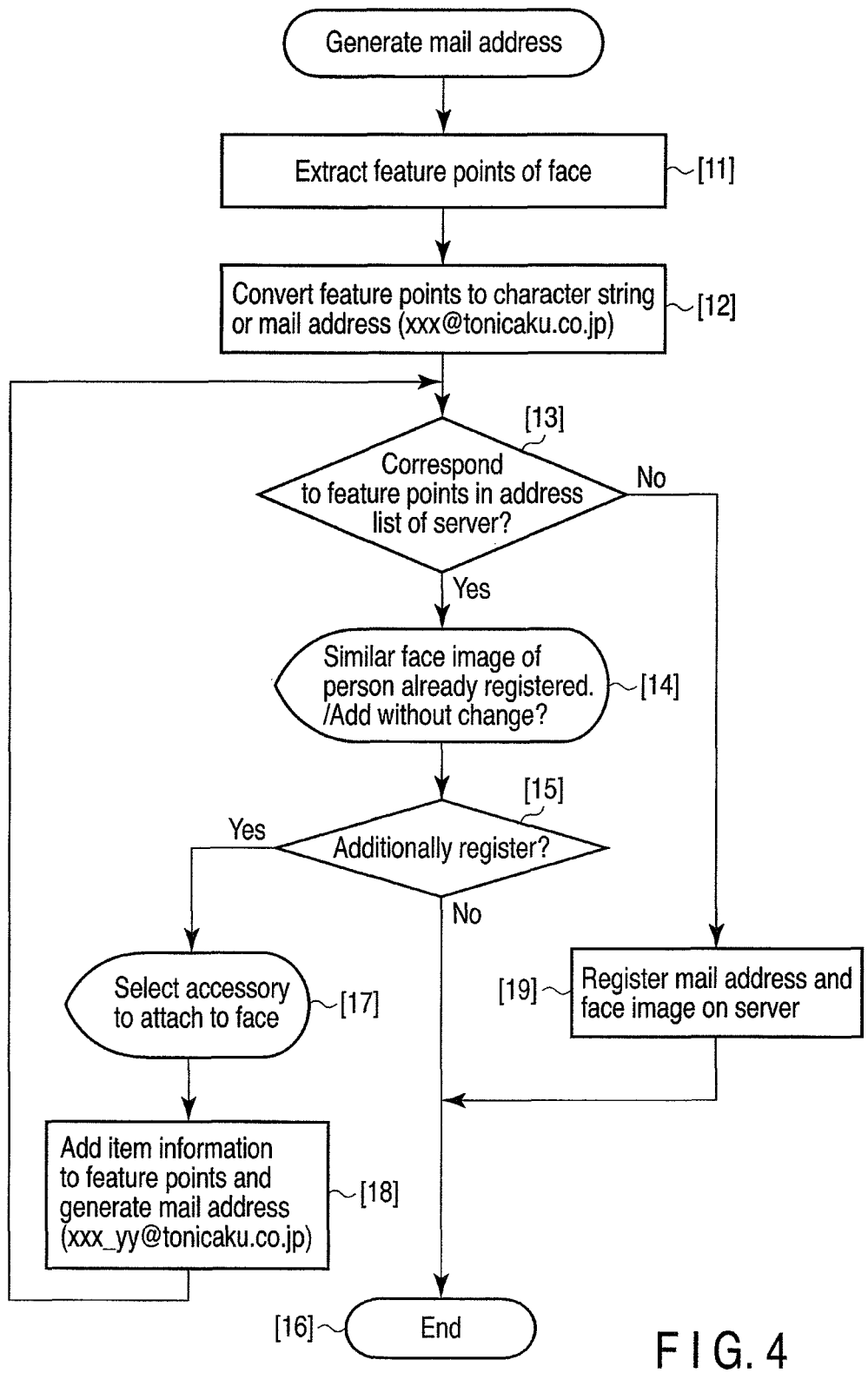
FIG. 4 is an exemplary diagram showing an example of the method of identifying and registering the face (facial image) attached to the received e-mail in the system shown in FIG. 1, according to an embodiment of the present invention.

FIG. 4 shows, in a software-like form, the flow of user operation described with FIG. 3, that is, the procedure of comparison between the registered facial image and a newly received facial image and of update registration or additional registration.

In FIG. 4, the "feature points of the face" are extracted from the facial image attached to the received e-mail (block [11]).

Figure 5:
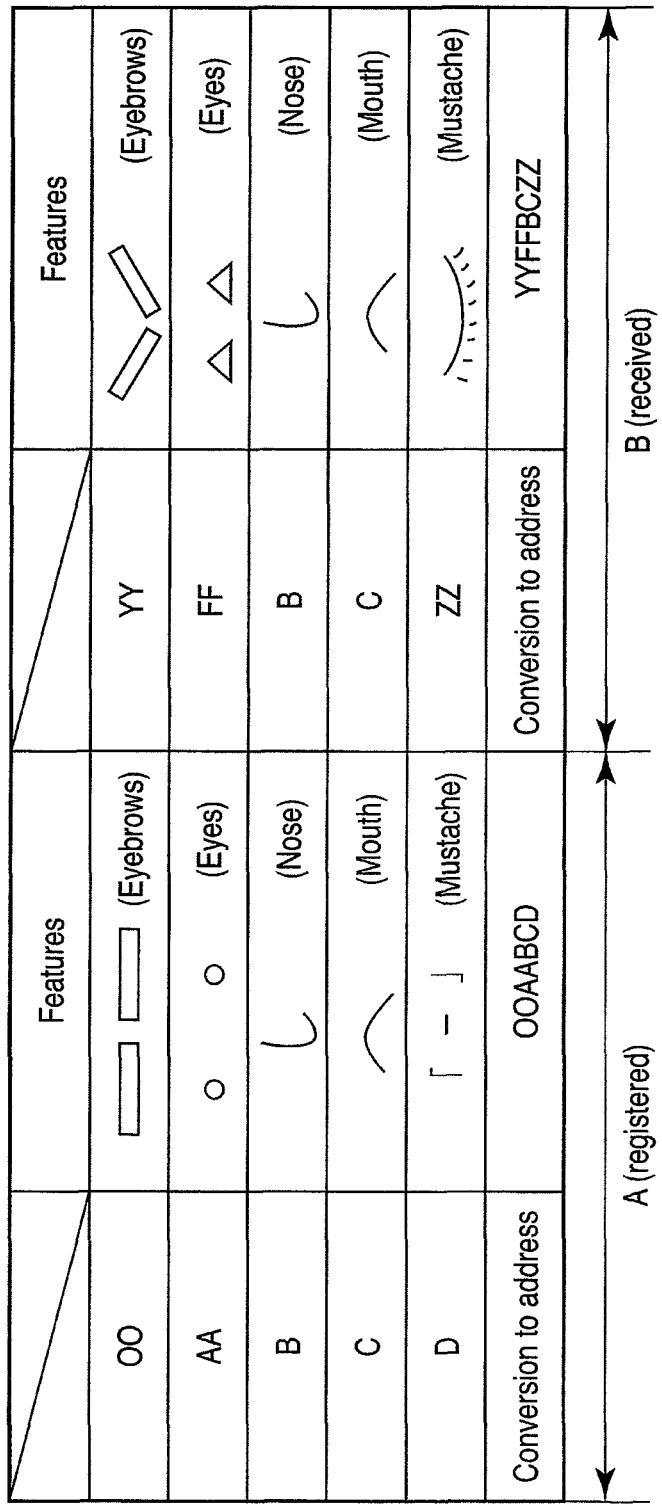
FIG. 5 is an exemplary diagram showing an example of the method of identifying the face (facial image) attached to the received e-mail shown in FIG. 4, according to an embodiment of the present invention.

Then, the extracted "feature points of the face" are converted to a character string or an e-mail address, for example, into "xxx@face.zzz.co.jp" in accordance with the method shown in FIG. 5 by way of example (block [12]).

Furthermore, the facial image converted to the character string or the e-mail address in block [12] is compared with the facial image which has already been registered in the address book, for example, with "xxx@face.zzz.co.jp". That is, whether the information registered in the address list (destination management table) 101 of the server 100 corresponds to the received facial image is determined (block [13]). When it can be confirmed in block [13] that the same address has already been registered (block [13]—YES), a GUI (warning indication) saying, for example, "Similar person already registered./Add without change?" is output to the screen of the television device 200 (block [14]).

When additional registration is selected by the user (recipient, that is, partner) (block [15]—YES), the user is prompted to select an accessory used to differentiate from the already registered facial image (block [17]). At the point where an accessory to be attached is specified by the user, an "e-mail address at which item (accessory) information is added to the feature points", for example, "xxx_yy@face.zzz.co.jp (_yy is added)" is created, and registered in the address book (block [18]). On the other hand, when the additional registration is not selected (block [15]—NO), the procedure simply comes to an end (block [16]). In the meantime, if the received facial image does not correspond to the already registered facial image (block [13]—NO), the e-mail address and the facial image are registered on the destination management table 101 of the server 100 except when an instruction is issued to delete or not to register the received facial image (block [19]).

Consequently, the recipient (partner) can always send an e-mail (reply) to the destination (sender) of the latest face. Moreover, this method ensures that the address of the particular same person can be selected even after the partner has grown, for example, even after the partner has undergone plastic surgery.

FIG. 5 shows an example of the conversion of the extracted "feature points of the face" to be attached to the received e-mail to a character string or an e-mail address.

Suppose, for example, "eyebrows", "eyes", a "nose", a "mouth" and a "mustache" as determination items of the feature points in the received facial image. The address of the facial image already registered in the address book is "00AABCD@face.zzz.co.jp", and an address converted from a newly received facial image is "YYFFBCZZ@face.zzz.co.jp". In this case, the part "BC" is determined to be the same or similar. Thus, the GUI (warning indication) saying, for example, "Similar person already registered./Add without change?" in block 03 shown in FIG. 3 or block 14 shown in FIG. 4 can be indicated.

Consequently, the recipient (partner) can always send an e-mail (reply) to the address (sender) of the latest face. Moreover, this method ensures that the address of the particular same person can be selected even after the partner has grown older, for example, even after the partner has undergone plastic surgery.

Moreover, when the above-mentioned ribbon (an accessory, that is, image component) or audio is added to the facial image, an address can be represented by, for example, " . . . HG23JUIEW23Z_RIBON@face.zzz.co.jp (_RIBON is added)" (simply addition).

It goes without saying that one new address can be prepared by embedding, for example, a character string or numbers of given digits corresponding to the "_RIBON" into the address. Alternatively, the address may have a character string that provides a particular function, for example, " . . . HG23JUIEW23Z_autoexe_audio@face.zzz.co.jp (_autoexe_audio is added") so that audio data may be reproduced when the partner (receiving end) who has received the e-mail in which the voice of the person at the sending end is integrated as the audio data selects this e-mail. In addition, if the audio data is selectively reproduced, for example, only when a similar face has already been registered, the sender (sending source) or the partner (receiving end) can be identified by audio.

FIG. 6 shows another example of the destination management table 101 retained by the video letter server 100.

The destination management table 101 contains, for example, six items of information. Identifiers 101α to 101ζ are allocated to the items to identify these items. The column of the identifier 101α indicates face IDs (numbers) used to identify the face of the sender or receiver. The column of the identifier 101β indicates formal facial images which are facial image data corresponding to the face IDs. The column of the identifier 101γ indicates the feature points of the face contained in the facial image data. The column of the identifier 101δ indicates links to the face IDs. The column of the identifier 101ε indicates the correspondence between the e-mail address and the facial image data (face IDs). The column of the identifier 101ζ indicate facial image data corresponding to the face IDs which are public facial images (e.g., facial images that are always open at a predetermined site on the network).

The ID number incremented (sequentially added) in the order of registration is written in each row of the column of the identifier 101α. This ID number is allocated to the facial image in the same row (in FIG. 6, 11 is allocated to a boy, 12 is allocated to an elderly man "grandfather", 13 is allocated to an elderly woman "grandmother", 14 is allocated to the elderly man and the elderly woman "grandfather of 12 and grandmother of 13", and 15 is allocated to a woman whose public facial image is open to the public).

Bitmap data for the facial image of the user taken in by the camera is registered in each row of the column of the identifier 101β. The bitmap data for the facial image may be data obtained by deleting background data around the facial image of the user (it is also possible to change the background of the facial image into a plain form such as a blue-back form, replace the background image with a still image separately taken by a digital camera, or replace the background image with moving images separately taken by the digital camera).

A code to recognize the feature points of the face of one user or the faces of a plurality of users included in the registered facial image is written in each row of the column of the face feature point 101γ.

One or more ID numbers allocated to the face of the same individual user are written in each row of the column of the identifier link 101δ. Therefore, as apparent from the column of 101ε, the e-mail address corresponding to ID14 is linked to the e-mail addresses of the elderly man "grandfather" of ID12 and the elderly woman "grandmother" of ID13 so that the e-mail addresses of these two persons may be available, for example, when an e-mail is sent to these persons at the same time. In addition, assuming that both the elderly man "grandfather" of ID12 and the elderly woman "grandmother" of ID13 see (receive) the e-mail at the same time via, for example, the photoframe 30, a new e-mail address targeted for these persons can be prepared (the row of ID14).

The public facial image of a particular person (e.g., the facial image that is always open at a predetermined site on the network) which is facial image data corresponding to each face ID is open to the public in each row of the column of the identifier link 101ζ (in the example of FIG. 6, the woman of ID15 alone has the public facial image open to the public).

FIG. 7 shows one example of the configuration of the address book linked to e-mail management addresses in the destination management table shown in FIG. 6.

Out of the e-mail management addresses shown in FIG. 6, for example, the ID numbers in the column of the identifier 101α and the bitmap data for the facial image in the column of the same identifier 101β are written in the address book shown in FIG. 7. The address book includes user IDs (substantially equal to the e-mail address) in the column of the same identifier 101ε, and a face information section in the column of the same identifier 101η. In addition, the facial image (the column of the identifier 101β) can also be acquired from the destination management table 101 of the server 100 on the basis of the user ID.

The face information in the column of the same identifier 101η serves to recognize whether the facial image registered in the address book is the formal facial image or public facial image shown in FIG. 6. In addition, the public facial image is, as described above, the facial image which is open at a predetermined site on the network, and is the public facial image of a particular person as the partner (receiving end) to whom the person intending to send a video letter mail sends the video letter mail.

That is, for example, in FIG. 6, when the "grandfather" of ID12 in the ID column 101β or the "grandmother" of ID13 in the same column is about to send an e-mail to the woman (ID15) having the public facial image open to the public, the sender, that is, the "grandfather" of ID12 or the "grandmother" of ID13 starts [face authentication e-mail sending] from the GUI in the screen of, for example, the television receiver 10 or the photoframe 30 using, for example, a remote controller terminal (not shown), without inputting the user ID or e-mail address by use of, for example, a keyboard or a mobile telephone. Then, the sender sets the facial image of the woman having the public facial image open to the public as a [sending destination]. Thus, an e-mail address is read from the address book, and the e-mail can be sent.

Furthermore, the e-mail, for example, based on audio or based on pictures (video moving pictures) and audio is sent to a receiving partner set as the [sending destination]. At this point, as shown in FIG. 8 by way of example, the following are added to the video mail:

(1) A video object (video data)
(2) The face mage of the sender
(3) The user ID (e-mail address)

of the sender. In addition, the user ID is not open to the public. Moreover, a picture of the face (facial image) of the sender is taken by a camera integrally provided in a terminal device operated by the sender at the time of sending, and sent to the [sending destination] together with the user ID.

Therefore, although described later with FIG. 11, the face (facial image) of the sender is transmitted to the partner (receiving end) in addition to the e-mail text (video mail) when the e-mail arrives at the receiving end (partner) set as the [sending destination].

Furthermore, at the partner (receiving end), the received facial image is compared with the facial image registered in the address book, and the facial image in the address book is updated if necessary (in accordance with the operation by the partner (receiving end). Moreover, a reply e-mail is sent from the partner (receiving end) to the sender, so that the address book of the sender is then updated to the latest facial image of the partner (because a facial image of the partner is also taken by a camera integrally provided in a terminal device operated by the partner at the time of sending (replaying) and transmitted together with the reply e-mail).

It should be understood that information added to the video mail is not limited to the example shown in FIG. 8, and may be as shown in FIG. 9:

(1) An address to a video object (address at which the video data is located)
(2) The facial image of the sender (including the user ID [e-mail address].)

Alternatively, information added to the video mail may be as shown in FIG. 10:

(1) A video object ID (ID for obtaining the video data from the server)
(2) The user ID of the sender (without taking a facial image at the time of sending, an image registered on the server can be acquired from the server and sent).

Figure 11:
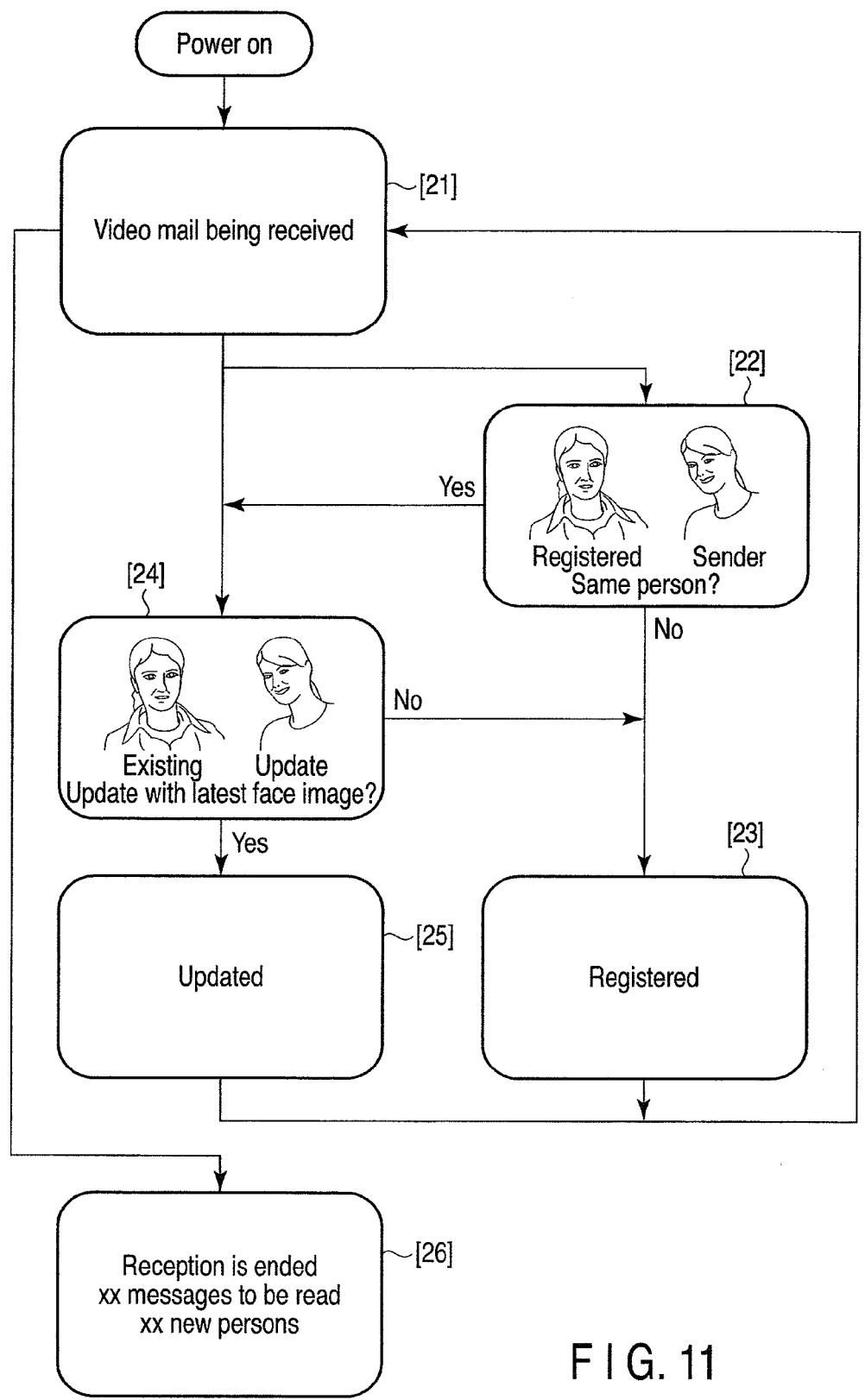
FIG. 11 is an exemplary diagram showing an example of a method of identifying and updating (registering) a face (facial image) attached to a received e-mail in the system shown in FIG. 1, according to an embodiment of the present invention.

FIG. 11 shows the outline of the flow of user operation in the e-mail system using the destination management table (see FIG. 6) formed in the video letter server shown in FIG. 1. In addition, processing shown in FIG. 11 corresponds to the "face authentication" processing/"collation" processing performed by the face authentication/collation processing apparatus 1 described later with FIG. 13, and processing performed by a given information processing apparatus also described later with FIG. 13 (in the example of FIG. 11, the controller 120 of the television receiver 10 in FIG. 1).

When the terminal device (the television receiver 200 installed in the house of the [grandfather of ID12 or the grandmother of ID13] shown in FIG. 6) is powered on at the user (receiving end (partner set as the sending destination), the user is informed that a video mail is being received (block [21]).

Although not shown, the sending source (sender) of the received video mail is specified by the GUI displayed in the remote controller terminal and in the screen of the television device 200, and whether this e-mail is the e-mail from the sending source (sender) registered in the address book is checked (block [22]).

When the sending source (sender) is not registered in the address book (block [22]—NO), the facial image of the sender is registered in the address book (server) (block [23]).

When the sender is registered in the address book (block [22]—YES), the received facial image is compared with the registered facial image (block [24]). When the received facial image is new, the registered facial image is updated in accordance with an update request from the user (block [25]).

Thus, if the e-mail arrives at the receiving end (partner) set as the [sending destination], the facial image registered in the address book of the partner (receiving end) is updated to the latest facial image belonging to the received e-mail. In particular, when the partner is already registered in the address book but shows a public face, it is preferable that a formal face is automatically overwritten and registered.

In addition, in order to determine whether the above-mentioned registered partner is different or the same, at least one or a combination of the following ways, for example, can be used:

(a) The e-mail address itself is compared; the user and the e-mail address correspond one
(b) The user ID is embedded in the e-mail address, and extracted for comparison
(c) The user ID is embedded in the facial image, and extracted for comparison.

Moreover, whether the facial image is the public face or the formal face can be easily determined by, for example, at least one or a combination of the following ways:

(d) A flag for determination is attached to the e-mail
(e) A flag for determination is embedded in the facial image.

On the other hand, as a method of registering the facial image (address) in the address book or a method of managing the facial image, at least one or a combination of the following ways, for example, can be used:

(A) An actual image is registered
(B) A face ID (the e-mail address as such may be used) or an acquisition address is acquired from an e-mail address management table.

In particular, (B) when the face ID is sent, the formal facial image is acquired from the e-mail address management table whenever the address book is opened, so that the face shown in the address book (the face registered in the address book) is always the latest formal face. Moreover, the face can be invisible (in-public) to a particular user.

In addition, the public face is, as described above, the facial image which is open at a predetermined site on the network, and is the facial image available for the person intending to send a video letter mail to specify the partner (receiving end) to whom the video letter mail is to be sent. For example, the public face is preferably the face registered at the issuance of the e-mail address to which consideration is given by using, for example, a mask or sunglasses so that an unspecified number of unknown people can not easily specify the person of the public face.

FIG. 12 shows, in a software-like form, the flow of user operation described with FIG. 11, that is, the procedure of comparison between the registered facial image and a newly received facial image and of automatic registration of the facial image.

The facial image (face) and the ID information attached to the received e-mail are acquired from the server (block [31]—YES), the face of the sender of the e-mail and the ID information are acquired from the server (block [32]).

Then, whether the "face of the sender and the ID information" that have been acquired are already registered in the address book is checked (block [33]). When the registration can be confirmed (block [33]—YES), whether the face (facial image) is a public face is checked (block [34]). When the registered face is the public face (block [34]—YES), the face in the address book is updated to the face attached to the e-mail (block [37]).

When the face whose registration can be confirmed (block [33]—YES) is not the public face (block [33]—NO), whether the face is different (from the registered face) is checked (block [35]). When the face is different (e.g., grown), the face in the address book is updated to the face attached to the e-mail (block [37]) if the user requests the updating of the face (facial image) (block [36]—YES).

On the other hand, when the "face of the sender and the ID information" that have been acquired are not registered in the address book (block [33]—NO), whether a similar face has already been registered is checked (block [38]). When the registered face determined to be a similar face is the same as the received face (block [39]—YES), the face in the address book is updated to the face attached to the e-mail in accordance with a request from the user to update the face (facial image) (block [41]).

When a similar face has already been registered (block [38]—YES) but the received face is different from the registered face (block [39]—NO) and when no registration of a similar face can be confirmed (block [38]—NO), the received face and an ID (address) are newly registered in the address book (block [42]).

Thus, the recipient (partner) can always send an e-mail (reply) to the destination (sender) of the latest face. Moreover, this method ensures that the address of the particular same person can be selected even after the partner has grown, for example, even after the partner has undergone plastic surgery.

FIG. 13 is a diagram explaining an example of the configuration of the face authentication/collation processing apparatus.

The face information (facial image) registered in the address book (server) described with FIGS. 3 and 4 or FIGS. 11 and 12 is acquired, authenticated and collated by the face authentication/collation processing apparatus 1. It goes without saying that the processing other than the face authentication/collation processing is performed by the controllers of the terminal devices operated by the sender (sending source) and the partner (receiving end) (representing the television receiver 10 in FIG. 1 and referred to as a controller 11).

The face recognition processing apparatus 1 is included of a main control unit 111, an image interface unit 112, a communication interface unit 113, a face detection unit 114, a face collation unit 115, and a storage unit 117, and others. It should be noted that a collation database is stored in the storage unit 117.

Although not shown, the main control unit 111 is formed of an MPU having, e.g., a program memory or a work memory, and the MPU executes a program (firmware) stored in the program memory to realize various functions.

The image interface unit 112 is an interface for inputting, to the face authentication/collation processing apparatus 1, an image (bitmap data having a resolution corresponding to the number of pixels of the camera to be used) taken by the camera 20a in FIG. 1 (or 30a, 40a) by which the camera 20a of the recorder 20 is connected to the television unit 10. Further, the communication interface unit 113 is an interface for communicating with the controller 11 of video equipment.

The face authentication/collation processing apparatus 1 authenticates and collates the facial image taken in from the camera 20a in response to a request from the controller 11, and feeds back the result to the controller 11 via the interface unit 113.

The face collation unit 115 collates the facial image detected by the face detector 114 with the facial image of a particular person stored in the database in the storage unit 116 (database containing information corresponding to 101a (101α), the facial image 101b (101β) and the face feature point 101c (101γ) in FIG. 2 or 6).

The face detector 114 detects the facial image of the person from the image taken by the camera 20a. At this point, the face detector 114 properly changes the tone and contrast of the taken image data to emphasize the outline. Thus, the edge of the shown facial image (e.g., the outline of the face, and the outlines of the eyes, nose and mouth) is highlighted so that patterns of the face including, for example, the eyes, nose and mouth can be easily detected. As a result, the boundary between an area where the facial image is located and an area where the surrounding background image is located is clearer, so that the background image part can be more easily deleted.

Furthermore, a two-dimensional region FA including the facial image is determined using, for example, a two-dimensional coordinate value originating from the upper left corner of a rectangular region including the facial image.

Then, while a face detection template (one or more standard face pattern prepared in advance) is being moved in the two-dimensional region FA of the facial image, a correlation value between the face pattern on the region FA and the standard face pattern prepared in advance is found by the face detector 114.

Thus, regarding the feature points (e.g., the eyes, nose and mouth) of the face pattern located at a particular position (x, y) represented by two-dimensional coordinates, the correlation value between this face pattern and the standard pattern is coded. The result is written in the face feature point 101c (101γ) of the destination management table 101 in FIG. 2 or 6. The row of the table where this result is written is the row where the original facial image by which the correlation value of the face is found is registered (e.g., a correlation value code of the feature points of the facial image registered in the row of ID=1 is written in the row of ID=1).

Now, it is assumed that a plurality of standard facial patterns of different sizes which are prepared in advance are $gs(i, j)$ and a correlation of each standard facial pattern $gs(i, j)$ and a local region (a region of, e.g., eyes, nose, or mouth) in an image $f(x, y)$ in the two-dimensional region FA is $Ms(x, y)$. In this case, for example, the correlation $Ms(x, y)$ in the local region can be obtained as follows:

$$Ms(x,y)=\Sigma f(x+i,y+i)gs(i,j)/\{\Sigma f(x+i,y+i)\cdot\Sigma gs(i,j)\} \qquad (1)$$

Here, the standard facial patterns gs(i, j) of different sizes can be created by, e.g., averaging previously collected facial patterns of a predetermined size.

As a method of obtaining the correlation Ms, a known method can be adopted. As an example, there is "a verification medium issuing apparatus and an identity collating apparatus" disclosed in Japanese Patent Application Publication (KOKAI) 2003-108935 (KOKAI) for reference (paragraphs 0043 to 0057 in this publication disclose a specific example that can be utilized in face authentication/collation processing).

The control unit 11 of the video equipment instructs the face authentication/collation processing apparatus 1 to perform face authentication/collation processing, and in response to the result of this processing, executes the processing described in FIGS. 3 to 5 or FIGS. 11 and 12. Connected to this controller 11 are: a display 121 for displaying facial image and reproducing a video mail in accordance with the configuration of equipment; a speaker 122 for outputting audio notification of the reception of an e-mail and audio in a video mail; a audio combination module (audio synthesizer) 123 which has a audio data memory (audio memory) for the audio notification output from the speaker 122 and which synthesizes a audio signal from the audio data; a video memory 124 in which thumbnails, dialogues or pictograms to be displayed on the display 121 are expanded; a remote controller 125 for receiving user operation; a hard disk drive (HDD) 126 for storing video letters and other information; and a memory (memory card) 127 for storing the video letters and other information.

The face authentication/collation processing apparatus 1 can access the destination management table 101 of the video letter server 100 via the Internet or home network, and suitably extract contents therein or suitably rewrite the contents (additional registration or deletion of unnecessary information).

In addition, the functions of the apparatus 1 and the controller 11 in FIG. 13 can be incorporated in the electronic devices which are the various home user terminal devices shown by way of example in FIG. 1 (e.g., the television receiver 10, the recorder 20, the photoframe 30, the television receiver 200, the personal computer 300, the game machine 400, the mobile telephone 500). However, the processing power for face authentication may be different in each device. For example, the television receiver 200 and the personal computer 300 can separately recognize even a plurality of faces present in one screen, while the game machine 400 and the mobile telephone 500 can recognize the face of only one user in front of the camera.

As described above, according to one embodiment of this invention, an address can not be conveyed by characters or words in the video mail service which requires no keyboard and uses the face itself as an address, so that a facial image is converted to an address by exchanging e-mails to enable the sending of an e-mail. Moreover, the face can be automatically registered in the address book. Thus, there is no need for previous registration of an e-mail address, and the user directly selects the face as the destination of the e-mail, so that the e-mail is never sent to the wrong person (the face is recognized by the user).

Furthermore, according to one embodiment of this invention, a face, that is, a formal e-mail address can be safely and securely obtained by the exchange of e-mails, and an e-mail can always be sent to the destination of the latest face with high accuracy. That is, the facial image is updated in every exchange of e-mails. This ensures that an address can be obtained even if the face has changed, for example, after growth.

Still further, an address is obtained by face recognition using the camera integrally provided in, for example, the television receiver, so that even older people or small children who are not necessarily good at the operation of a keyboard or at entering letters can enjoy the advantage of e-mail. Especially, e-mails can be sent and received by widely spread television receivers without being bound by an e-mail-oriented environment typically enabled by, for example, mobile telephones or personal computers. Thus, the convenience of users is significantly enhanced, so that sending of an e-mail can be as easy as making a telephone call. Moreover, the combination of the advantages of telephones and e-mail enables a plurality of persons such as family members to see or send an e-mail.

Further yet, according to one embodiment of this invention, an e-mail address can be easily obtained by taking a picture of the face of a user who is to send an e-mail. Moreover, an existing environment can be used as a network environment, which ensures high convenience for users.

In addition, if an image containing a plurality of faces is registered, an e-mail address for a particular group such as a married couple can be generated. In this case, an e-mail can also be sent to the addresses held by each person, which further enhances the convenience for users.

Embodiments of this invention are not limited to the embodiments described above and can be modified in various manners without departing from the spirit and scope of the invention.

For example, an embodiment of the invention can provide an information processing method comprising: extracting feature parts from facial image data for a sender attached to an e-mail which has been sent to facial image data open to the public as an address; determining from the extracted feature parts whether the e-mail has been sent from the same sender as a sender of already retained facial image data, determining whether the e-mail has been sent from another sender similar to the sender of the already retained facial image data, determining whether attached facial image data is different from the already retained facial image data while the e-mail has been sent from the same sender as the sender of the already retained facial image data, and determining whether the e-mail is a newly sent e-mail; and newly registering, as an address, facial image data for the sender attached to the newly sent e-mail.

An embodiment of the invention can also provide to an information processing method comprising: extracting feature parts from facial image data for a sender attached to an e-mail which has been sent to facial image data open to the public as an address; determining from the extracted feature parts whether the e-mail has been sent from the same sender as a sender of already retained facial image data, determining whether the e-mail has been sent from another sender similar to the sender of the already retained facial image data, determining whether attached facial image data is different from the already retained facial image data while the e-mail has been sent from the same sender as the sender of the already retained facial image data, and determining whether the e-mail is a newly sent e-mail; and newly registering, as an address, facial image data for the sender attached to the newly sent e-mail, wherein the facial image data for the sender attached to the sent e-mail includes data in which an image of the sender is taken by an imaging mechanism integrally provided in an electronic device available to the sender.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, the sending end user terminal (10, 20, 30) and the receiving end terminal (200, 300, 400, 500) function as sending and receiving terminals, respectively.

What is claimed is:

1. An information processing method comprising:
   obtaining first image data on a first face of a first user;
   generating first address information by extracting first feature points of the first face of the first user from the first image data and using the first feature points;
   obtaining second image data on a second face of a second user;
   generating second address information b extracting second feature points of the second face from the second image data and using the second feature points if the second image data is similar to the first image data and the second user is different from the first user.

2. The information processing method of claim 1, further comprising:
   generating a code or a character string by using the first or second feature points; and
   including the code or character string in the address information corresponding to the code or character string.

3. The information processing method of claim 1, wherein each of the address information comprises an email address.

4. The information processing method of claim 1, further comprising:
   updating registered image data corresponding to third address information based on obtained image data, if the obtained image data differs from the registered image data and if an updating request is made.

5. The information processing method of claim 1, further comprising:
   updating registered image data corresponding to third address information based on obtained image data, if the obtained image data differs from the registered image data or if an updating request is made.

6. The information processing method of claim 1, further comprising, checking to whether any accessory is attached to the second image data in order to differentiate the second image data from the first image data.

7. An information processing device comprising:
   a receiving module configured to obtain image data on a first face of a first user; and
   an information processing module configured to generate first address information by extracting first feature points of the first face of the first user from the first image data and using the first feature points,
   wherein if second image data on a second face is obtained, the information processing module
   generates second address information b extracting second feature points of the second face from the second image data and using the second feature points, if the second image data is similar to the first image data and the second user is different from the first user.

8. The information processing device of claim 7, wherein the information processing module comprises:
   a module configured to generate a code or a character string by using the feature points; and
   a module configured to include the code or character string in the address information corresponding to the code or character string.

9. The information processing device of claim 7, wherein the information processing module is further configured to generate the address information as an email address.

10. The information processing device of claim 9, wherein the information processing module is further configured to attach the image data to the mail address corresponding to the image data, for transmission.

11. The information processing device of claim 7, wherein the information processing module is further configured to register third image data in a destination management table in which the address information is registered, upon reception of the third image data.

12. The information processing device of claim 7, wherein the information module further checks to whether any accessory is attached to the second image data in order to differentiate the second image data from the first image data.

13. A non-transitory computer readable medium having stored thereon a computer program which is executable by a computer, the computer program controlling the computer to execute functions of:
   obtaining first image data on a first face of a first user;
   generating first address information by extracting first feature points of the first face of the first user from the first image data and using the first feature points;
   obtaining second image data on a second face of a second user;
   generating second address information b extracting second feature points of the second face from the second image data and using the second feature points, if the second image data is similar to the first image data and the second user is different from the first user.

14. The computer readable medium of claim 13, further controlling the computer to execute functions of:
   generating a code or a character string by using the first or second feature points; and
   including the code or character string in the address information corresponding to the code or character string.

15. The computer readable medium of claim 13, wherein each of the address information is an email address.

16. The computer readable medium of claim 13, further controlling the computer to execute a function of:
   updating registered image data corresponding to third address information based on obtained image data, if the obtained image data differs from the registered image data and if an updating request is made.

17. The computer readable medium of claim 13, further controlling the computer to execute a function of:
   updating registered image data corresponding to third address information based on obtained image data, if the obtained image data differs from the registered image data or if an updating request is made.

18. The computer readable medium of claim 13, further controlling the computer to execute functions of:
   checking to whether any accessory is attached to the second image data in order to differentiate the second image data from the first image data.

* * * * *